(12) United States Patent
Delling et al.

(10) Patent No.: US 9,170,846 B2
(45) Date of Patent: Oct. 27, 2015

(54) DISTRIBUTED DATA-PARALLEL EXECUTION ENGINES FOR USER-DEFINED SERIAL PROBLEMS USING BRANCH-AND-BOUND ALGORITHM

(76) Inventors: Daniel Delling, Mountain View, CA (US); Mihai Budiu, Sunnyvale, CA (US); Renato F. Werneck, San Francisco, CA (US)

( * ) Notice: Subject to any disclaimer, the term of this patent is extended or adjusted under 35 U.S.C. 154(b) by 1101 days.

(21) Appl. No.: 13/074,006

(22) Filed: Mar. 29, 2011

(65) Prior Publication Data

US 2012/0254597 A1    Oct. 4, 2012

(51) Int. Cl.
G06F 9/38 (2006.01)
G06F 9/50 (2006.01)
G06F 17/11 (2006.01)
H04L 29/08 (2006.01)

(52) U.S. Cl.
CPC .............. *G06F 9/5027* (2013.01); *G06F 17/11* (2013.01); *G06F 2209/5017* (2013.01); *H04L 67/1002* (2013.01); *H04L 67/104* (2013.01); *H04L 67/1031* (2013.01)

(58) Field of Classification Search
CPC .............. H04L 67/104; H04L 67/1031; H04L 67/1002
USPC .......................... 718/104; 712/233, E09.045
See application file for complete search history.

(56) References Cited

U.S. PATENT DOCUMENTS

| | | | |
|---|---|---|---|
| 5,822,604 A | 10/1998 | Ogasawara et al. | |
| 5,848,402 A | 12/1998 | Pao et al. | |
| 6,088,511 A * | 7/2000 | Hardwick | 717/149 |
| 6,449,667 B1 * | 9/2002 | Ganmukhi et al. | 710/28 |
| 7,350,036 B2 * | 3/2008 | Kim et al. | 711/149 |
| 7,647,590 B2 * | 1/2010 | Archer et al. | 718/100 |
| 8,028,291 B2 * | 9/2011 | Altshuler et al. | 718/104 |
| 8,527,590 B2 * | 9/2013 | Tapolcai et al. | 709/205 |
| 8,612,510 B2 * | 12/2013 | Dean et al. | 709/201 |
| 8,683,471 B2 * | 3/2014 | Brent et al. | 718/102 |
| 8,819,106 B1 * | 8/2014 | Sirota et al. | 709/201 |
| 2003/0005068 A1 * | 1/2003 | Nickel et al. | 709/208 |
| 2004/0236869 A1 * | 11/2004 | Moon | 709/246 |
| 2010/0110047 A1 * | 5/2010 | Yoon et al. | 345/204 |
| 2010/0122065 A1 * | 5/2010 | Dean et al. | 712/203 |
| 2010/0199257 A1 * | 8/2010 | Biggerstaff | 717/104 |
| 2010/0275212 A1 * | 10/2010 | Saha et al. | 718/104 |
| 2012/0198466 A1 * | 8/2012 | Cherkasova et al. | 718/104 |

OTHER PUBLICATIONS

Melab, et al., "Grid Computing for Parallel Bioinspired Algorithms", Retrieved at <<http://sci2s.ugr.es/docencia/algoritmica/Melab-Grid.pdf>>, Mar. 20, 2006, pp. 1052-1061.

(Continued)

*Primary Examiner* — Meng An
*Assistant Examiner* — Abu Ghaffari
(74) *Attorney, Agent, or Firm* — Judy Yee; Micky Minhas

(57) ABSTRACT

A distributed data-parallel execution (DDPE) system splits a computational problem into a plurality of sub-problems using a branch-and-bound algorithm, designates a synchronous stop time for a "plurality of processors" (for example, a cluster) for each round of execution, processes the search tree by recursively using a branch-and-bound algorithm in multiple rounds (without inter-processor communications), determines if further processing is required based on the processing round state data, and terminates processing on the processors when processing is completed.

20 Claims, 5 Drawing Sheets

(56) References Cited

OTHER PUBLICATIONS

Barbucha, et al., "Jade-Based A-Team as a Tool for Implementing Population-Based Algorithms", Retrieved at <<http://ieeexplore.ieee.org/stamp/stamp.jsp?tp=&arnumber=4021874>>, Proceedings of the Sixth International Conference on Intelligent Systems Design and Applications, Oct. 16, 2006, pp. 6.

Efraimidis, et al., "Efficient Approximation Algorithms for Scheduling Unrelated Parallel Machines", Retrieved at <<http://utopia.duth.gr/~pefraimi/research/data/2003BCI.pdf>>, Retrieved Date: Dec. 28, 2010, pp. 11.

Ekanayake, et al., "Twister: A Runtime for Iterative MapReduce", Retrieved at <<http://www.iterativemapreduce.org/hpdc-camera-ready-submission.pdf>>, 2010, pp. 9.

Nykiel, et al., "MRShare: Sharing Across Multiple Queries in MapReduce", Retrieved at<<http://queens.db.toronto.edu/~tnykiel/docs/papers/all/mrshare-vldb10.pdf>>, Proceedings of the VLDB, vol. 3, No. 1, 2010, pp. 12.

Park, et al., "Predictable Time-Sharing for DryadLINQ Cluster", Retrieved at<<http://www.cs.virginia.edu/~sp2kn/paper/Dryadlinq.pdf>>, Proceedings of IEEE ICAC 2010, pp. 10.

Isard, et al., "Dryad: Distributed Data-Parallel Programs from Sequential Building Blocks", Retrieved at<<http://research.microsoft.com/pubs/63785/eurosys07.pdf>>, Mar. 21-23, 2007, pp. 14.

Dean, et al., "MapReduce: Simplified Data Processing on Large Clusters", Retrieved at <<http://static.googleusercontent.com/external_content/untrusted_dlcp/labs.google.com/en//papers/mapreduce-osdi04.pdf>>, OSDI'04 Proceedings of the 6th conference on Symposium on Operating, 2004, pp. 13.

"Apache Hadoop", Retrieved at <<http://hadoop.apache.org/>>, Oct. 14, 2010, pp. 3.

Karloff, et al., "Model of Computation for MapReduce", Retrieved at <<http://research.yahoo.com/files/mrc.pdf>>, 2010, pp. 11.

Ranger, et al., "Evaluating mapreduce for multi-core and multiprocessor systems", Retrieved at <<http://citeseerx.ist.psu.edu/viewdoc/download?doi=10.1.1.137.2453&rep=rep1&type=pdf>>, Feb. 10-14, 2007, pp. 12.

Yu, et al., "DryadLINQ: A System for General-Purpose Distributed Data-Parallel Computing Using a High-Level Language", Retrieved at <<http://research.microsoft.com/en-us/projects/DryadLINQ/DryadLINQ.pdf>>, Jun. 29-Jul. 2, 2009, pp. 1-14.

Crainic, et al., "Parallel branch-and-bound algorithms", Retrieved at <<http://citeseerx.ist.psu.edu/viewdoc/download?doi=10.1.1.92.2645&rep=rep1&type=pdf>>, Dec. 1994, pp. 1-28.

"Parallel branch-and-bound algorithms: Survey and synthesis", Retrieved at <<http://www.iro.umontreal.ca/~gendron/Pisa/References/BB/Gendron94.pdf>>, vol. 42, No. 6, Nov-Dec 1994, pp. 26.

Lai, et al., "Anomalies in Parallel Branch-and-Bound Algorithms", Retrieved at <<http://citeseerx.ist.psu.edu/viewdoc/download?doi=10.1.1.12.3044&rep=rep1&type=pdf>>, vol. 27, Issue 6, Jun. 1984.

Karp, et al., "Randomized Parallel Algorithms for Backtrack Search and Branch-and-Bound Computation", Retrieved at <<http://rsim.cs.illinois.edu/arch/qual_papers/systems/7.pdf>>, vol. 40, No. 3, Jul. 1993, pp. 765-789.

Tscoke, et al., "Solving the traveling salesman problem with a distributed branch-and-bound algorithm on a 1024 processor network", Retrieved at <<http://citeseerx.ist.psu.edu/viewdoc/download?doi=10.1.1.52.8992&rep=rep1&type=pdf>>, Apr. 25-28, 1995, pp. 1-24.

Polzin, Tobias, "Algorithms for the Steiner problem in networks", Retrieved at <<http://citeseerx.ist.psu.edu/viewdoc/download?doi=10.1.1.83.2825&rep=rep1&type=pdf>>, May 2003, pp. 126.

Andrade, et al.,"Dual Heuristics on the Exact Solution of Large Steiner Problems", Retrieved at <<http://rutcor.rutgers.edu/~dandrade/papers/ismp2000.pdf>>, Aug. 2000, pp. 26.

Uchoa, et al., "Fast local search for steiner trees ingraphs", Retrieved at <<http://www.siam.org/proceedings/alenex/2010/a1x10_001_uchoae.pdf>>, 2010, pp. 10.

Koch, et al., "SteinLib: An updated library on Steiner tree problems in graphs", Retrieved at <<http://opus4web.zib.de/documents-zib/610/ZR-00-37.pdf>>, Nov. 2000, pp. 37.

\* cited by examiner

100

DISTRIBUTED DATA-PARALLEL EXECUTION ENGINES FOR USER-DEFINED SERIAL PROBLEMS USING BRANCH-AND-BOUND ALGORITHM

BACKGROUND

A distributed data-parallel execution engine (DDPE engine or DDPEE)—such as Dryad, MapReduce, and Hadoop—provides a computation model that performs in parallel several independent sequential computations comprising subcomponents of a larger computation. However, in order to achieve necessary processing efficiencies, there are several requirements (or restrictions) common to these models. One requirement is that each subcomponent must run in a separate isolated address space for its complete lifetime. Another requirement is that data exchanges can only occur between each "round" of processing (since communications are expensive). Since a DDPE engine is generally used to process a large number of independent data items, these items must be grouped into relatively large batches (also referred to as partitions or shards) with a relatively uniform execution time per batch in order to ameliorate the expensive costs of communication and process creation/destruction. These several requirements, however, make it difficult to solve general optimization problems on a DDPE engine which typically require substantial communications between separate tasks, and especially in the communication of intermediate results.

A well-known approach to solving hard optimization problems is to traverse branch-and-bound (B&B) trees where the root of the tree is the original problem and the nodes stemming therefrom represent logical sub-problems that collectively correspond to the original problem to be solved. In the worst case scenario, the total number of nodes—which correspond to the problem size—can be exponentially large, and thus in practice the algorithms used with B&B trees attempt to resolve that certain branches of the tree cannot possibly contain the optimal solution and can therefore be pruned without negatively impacting the correctness of the solution. Even with pruning, however, seemingly small problems can lead to huge search trees, which are seemingly well-suited for a distributed execution approach where a cluster of computers could significantly reduce execution time. Nevertheless, existing B&B tree solvers are typically based on complex parallel computation frameworks that employ frequent communications between cluster machines, while DDPE engines have generally been deemed to be unsuited to these tasks because of their rigid requirements/restrictions regarding inter-machine communications.

SUMMARY

Disclosed herein are implementations directed to methods for a distributed data-parallel execution (DDPE) system (comprising an engine, a director which generates distributed jobs for the engine, starting from programs or queries, and/or a front-end library which generates queries for the director, in the process of solving an optimization problem) for splitting a computational problem into a plurality of sub-problems using a branch-and-bound algorithm, designating a synchronous stop time for a "plurality of processors" (e.g., a cluster) for each round of execution, processing the search tree by recursively using a branch-and-bound algorithm in multiple rounds (without inter-processor communications), determining if further processing is required based on the processing round state data, and then terminating processing on the plurality of processors when processing is completed. Also disclosed herein are implementations directed to systems and computer instructions for distributed data-parallel execution comprising a first processor (such as a client workstation) and a plurality of processors constituting a distributed data-parallel execution (DDPE) system (such as a cluster) executing the method described above.

Several implementations are directed to a library that enables massively parallel and distributed execution of optimization algorithms for solving hard problems by performing an exhaustive search of the solution space using branch-and-bound, that is, by recursively splitting the original problem into many simpler sub-problems.

Several implementations disclosed herein may use both parallelism (at the core level) and distributed execution (at the machine level). Moreover, certain embodiments are directed to a user interface where the user of the library only needs to implement sequential code to process individual sub-problems either by solving them in full or generating new sub-problems. For several implementations, the parallelism and distribution may be handled automatically and may be invisible to the user. Several implementations may be implemented on top of distributed data-parallel execution engines—such as, for example, DryadLINQ, Hadoop, and Map-Reduce—such that, despite the use of a constrained application model (with restricted communication patterns), such implementation can scale linearly in performance with the number of machines without much overhead.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
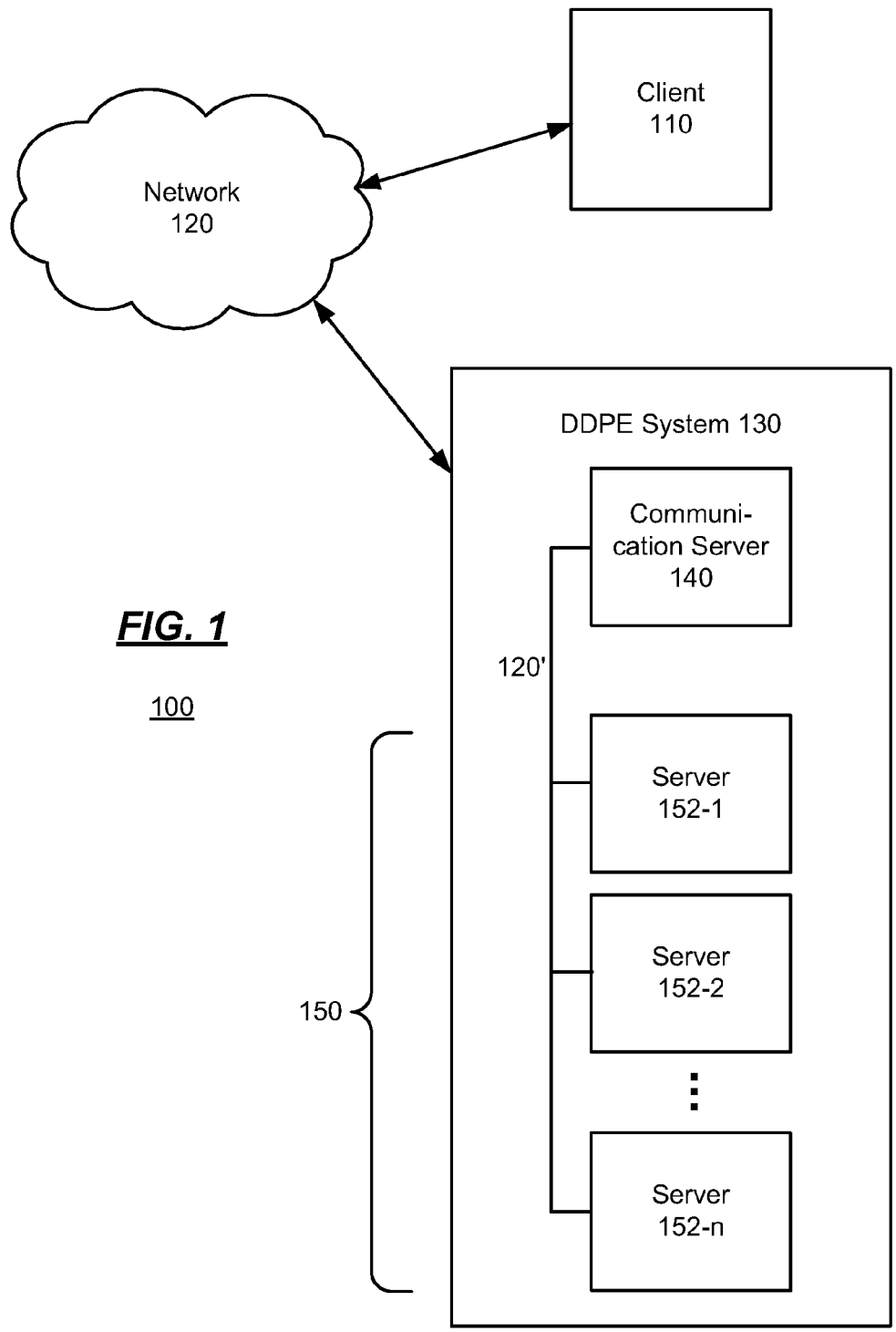
FIG. 1 is an illustration of an exemplary networked computer environment in which the numerous implementations disclosed herein may be utilized.

Parallel computing is a form of computation in which many calculations are carried out simultaneously with the idea that large problems can often be divided into smaller problems which can solved concurrently ("in parallel") for efficiency. However, parallel computer programs are more difficult to write than sequential ones because concurrency ("operating in parallel") introduces several new classes of potential bugs, conflicts, data accessing and utilization inconsistencies, and a host of other potential errors. Consequently, communication and synchronization between the different concurrent processes are major challenges in achieving good efficiency and consistency. For this reason, most parallel programming languages and parallel computing systems use some kind of consistency model that defines rules for how parallel processing operations occur and how results are produced. There are several different forms of parallel computing, such as bit-level, instruction level, task, and data parallelism. This last form, data parallelism, focuses on distributing the data across different computing nodes to be processed in parallel such as, for example, parallelism inherent in program loops where similar (though not necessarily identical) operation sequences or functions are being performed on elements of a large data structure (which are common to many scientific and engineering applications).

A multicore processor is a processor that includes multiple execution units ("cores") on the same chip. As such, a multicore processor can issue multiple instructions per cycle from multiple instruction streams. A multiprocessor computer, in comparison, is a stand-alone computer system (or "machine") with multiple processors that share memory and may connect via a bus, point-to-point links, or other high-speed means; however, "bus contention" (where more than one processor attempts to use the bus at the same time) and similar limitations may prevent these computer systems from scaling to more than 32 processors. As such, a multiprocessor computer may comprise one or more multicore processors.

A distributed computer (sometime referred to as a distributed memory multiprocessor) is comprised of multiple processors connected by a network (and thus is highly scalable) to solve computational problems using parallel computing (where a problem is divided into many sub-problems, each of which is solved by different processor). For example, a massively parallel processor (MPP) is a single stand-alone computer with many networked processors using specialized high-speed interconnect networks where generally each processor has its own memory, copy of the operating system, and copy of the application(s). In contrast, a cluster (or cluster computer system) is a distributed computer comprising multiple computer systems (each a "cluster computer" or a "machine") connected by a network where each machine has its own processing elements, memory, operating system, and applications, and the network generally comprises commodity networking hardware. A grid computer system (or grid) is similar to a cluster but where the networked computers communicate over the Internet which, because of its relatively low bandwidth and high latency, are the most distributed form of parallel computing and typically deals only with "embarrassingly parallel" problems, that is, problems that are easily split into parallel tasks that require little or no communication between such tasks. Regardless, a distributed computer—whether an MPP, a cluster, or a grid—may comprise one or more multiprocessor computers and/or comprise one or more multicore processors. There are also several specialized parallel/distributed computer systems such as, for example, based on reconfigurable computing systems with field-programmable gate arrays, general-purpose computing systems on graphics processing units, application-specific integrated circuits, vector processors, to name a few.

Notwithstanding the foregoing, the terms "concurrent," "parallel," and "distributed" strongly overlap, and are used interchangeably herein such that a same system may be characterized as "parallel" and/or "distributed" without loss of generality such that processors in a distributed system run concurrently in parallel. Where distinctions are necessary and the terms are in disjunctive and in obvious conflict to a person of ordinary skill in the relevant art, then the term "parallel" as used in parallel computing shall refer to all processors have access to a shared memory that can be used to exchange information between processors, whereas the term "distributed" as used in distributed computing shall refer to each processor having its own private memory (a part of the "distributed memory") where information is exchanged by passing messages between the processors (presumably through an intermediary of some kind).

A DDPE engine is a general purpose runtime for execution of data-parallel applications. An application written for a DDPE director for execution on a DDPE engine may be modeled as a directed acyclic graph (DAG) defining the dataflow of the application where the vertices of the DAG defines the operations that are to be performed on the data. Scheduling of the computational vertices on the available cluster hardware is handled by the DDPE engine without any explicit intervention by the developer of the application or administrator of the network. The flow of data between one computational vertex to another is implemented by using communication "channels" between the vertices, which in physical implementation may be implemented as TCP/IP streams, shared memory, or temporary files written to shared storage.

The DDPE director provides a programming environment for writing large-scale data-parallel applications running on large clusters, and the purpose of the DDPE director is to make distributed computing on a large computer cluster simple enough for programmers. Features for the DDPE director may include: declarative programming where computations are expressed in a familiar high-level language such as SQL; automatic parallelization where sequential declarative code can be used to generate highly parallel query plans spanning large computer clusters (as well as multiple processors in the same core or machine); type safety where distributed computations are statically type-checked; automatic serialization provided by data transport mechanisms that automatically handle all of the necessary object types; job graph optimizations, both static and dynamic; and/or conciseness. The DDPE director may utilize a domain-specific language implemented, for example, via a C++ library that is used to create and model a DAG for execution. As such, the computational vertices may be written using standard C++ constructs but, to make them accessible to the DDPE director for execution by the DDPE executive engine, these constructs might need to be encapsulated in a class that inherits from another base class. The graph can then be defined by adding edges using a composition operator (defined by the DDPE engine) that connects two graphs (or two nodes of a graph) with an edge.

A DDPE front-end library provides an infrastructure which allows a programmer (user) to use the resources of a computer cluster or a data center—possibly comprising thousands of machines, each of which having multiple processors or cores—for running data-parallel programs without knowing anything about concurrent programming. Using a DDPE front-end library, a DAG constituting an optimization problem may be written using sequential constructs, devoid of any concurrency or mutual exclusion semantics necessary for parallel processing, where the DDPE front-end library comprises an application programming interface (API) that automatically parallelizes the dataflow graph based on the serial constructs by distributing the computational vertices across various execution engines (which can be multiple processor cores on the same computer or different physical computers connected by a network as in a cluster, or a combination of both).

A branch-and-bound (B&B) algorithm is a well-known technique for solving optimization problems which may leverage the power of parallel processing. In summary, the B&B algorithm interprets an input problem as the root node of a search tree, and then two basic operations are recursively executed: (i) branch one node (or problem) into several smaller and computationally-easier nodes (sub-problems) and (ii) bound (or prune) the search tree when either the problem has become easy enough to directly solve or when it can be proven that the node (and, by implication, its descendants) cannot contribute to the optimal solution. Stated differently, a B&B algorithm—used to find optimal solutions of various optimization problems—consists of a systematic enumeration of all candidate solutions where large subsets of "fruitless candidates" (those that cannot possibly contain the optimum solution) can be discarded en masse using lower and/or upper bounds of the quantity being optimized.

In the B&B algorithm, a problem is first "branched" by recursively splitting the optimization problem into smaller and smaller sub-problems represented as nodes in a resulting search tree structure such that, ideally, the nodes are non-overlapping. At every split, each node is also "bounded," that is, the node is processed to determine estimated upper and lower bounds for the possible solutions stemming the node. For a minimization (an optimization to find a minimum value), for example, those nodes having a lower bound (best local solution possible) greater than the upper bound of another node can be safely discarded (or "pruned") without further processing (splitting or solving). Typically, pruning is implemented by maintaining a global variable m (shared by all nodes in the tree) that tracks the minimum upper bound from among all nodes as they are processed, and then any node whose lower bound is greater than m is discarded. This recursive splitting/pruning operations continue until all non-pruned nodes in the tree are effectively reduced (or "solved") to a single minimum solution that constitutes both the upper and lower bound for that node and are equal to the global variable m, such that m represents the optimal solution to the original problem and the remaining non-pruned nodes represents the only path(s) for achieving that result.

The efficiency of the algorithm depends strongly on the node-splitting procedure and on the upper and lower bound estimators. Moreover, it should be noted that, at any point in the process, the maximum lower bound and the minimum upper bound from among all non-pruned sections effectively define a range of values that contain the global minimum. Consequently, when a range of values is an acceptable output (in lieu of the exact minimum value), such as when there is an overriding time constraint, the algorithm may be terminated when some other criterion for an acceptable range result, such as when the difference between the global upper and lower bounds divided by the sum of the upper and lower bounds falls below some threshold value.

During the search tree traversal, the nodes comprising the search front (which comprises all open sub-problems, that is, sub-problems that remain unsolved, undivided, and undiscarded) are processed independently where the only shared resource is the best solution currently known to the system (referred to as the "incumbent"). As such, a challenge for such frameworks is to keep the computational resources fully utilized. Although one approach would be to simply distribute a small frontier of sub-problems evenly to each machine in the cluster and then permit each machine to solve to completion its portion of the original problem sequentially and autonomously, this approach fails in practice because search trees often become highly unbalanced such that, towards the end of processing, all but one machine might be sitting idle waiting for the one machine with the most work to finish. More sophisticated approaches thus rely on "work stealing" (where one machine in the cluster can ask other machines for new sub-problems when the one machine completes its own work) or on a central scheduler that directs work sharing among machines in the cluster to maintain balance. However, these practices require substantial inter-machine communication (to communicate states and move work from one machine in the cluster to another), and since a DDPE engine does not support direct inter-machine communication these traditional approaches are not feasible for a DDPE system.

However, utilizing a combination of batched communications between processing rounds to load-balance and update relevant global information, various implementations disclosed herein are directed to a modular software architecture that implements a generic B&B algorithm on a DDPE engine framework by automatically parallelizing the B&B algorithm despite the restrictions of DDPE engine frameworks. Several implementations adapt the impedance of the platform entirely at the application level (i.e., without changing the cluster infrastructure or director) to match the specific needs of the B&B algorithms, including but not limited to data-parallel tree-traversal, load balancing, coordination, handling nondeterminism, and re-execution for reliability. For numerous implementations, processing efficiencies may scale linearly with the number of machines utilized and may achieve excellent cluster utilization even when running on multiprogrammed clusters offering unpredictable resources (such as clusters having a dynamically variable number of available machines). Certain implementations may be made available as a library that user programs can link against, and several implementations may make the distribution and parallelism code invisible or transparent to users such as, for example, software developers with expertise in traditional sequential algorithms but who have no expertise in writing parallel processing code.

FIG. 1 is an illustration of an exemplary networked computer environment 100 in which the numerous implementations disclosed herein may be utilized. The network environment 100 may include one or more clients, such as client 110, configured to communicate with each other or with one or more servers, such as communication server 140, through a network 120. The network 120 may be a variety of network types including the public switched telephone network (PSTN), a cellular telephone network, and a packet switched network (e.g., the Internet). While the client 110 and the server 140 are illustrated as being connected by the network 120, in some implementations it is contemplated that the client 110 and the server 140 may be directly connected to each other or even executed by the same computing system.

As shown in FIG. 1, and for several implementations disclosed herein, the communication server 140 may be part of a distributed data-parallel execution (DDPE) system 130 comprising the communication server 140 and other computers (or processors) in a cluster 150 comprising a plurality of cluster machines or servers 152-1, 152-2, . . . , 152-n (each also referred to as a "machine" or "cluster server") interconnected by a network 120'. The communication server 140 may be a separate machine from the machines in the cluster 150 (as shown) or the communication server 140 may also comprise a machine in the cluster 150.

Figure 4:
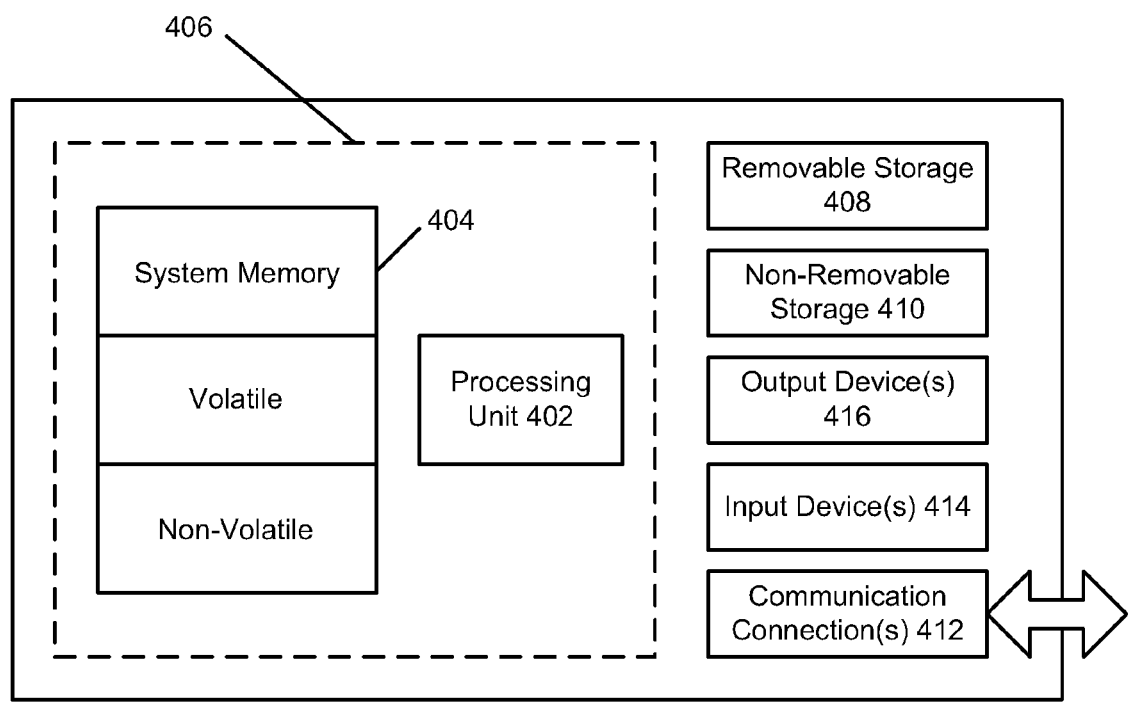
FIG. 4 shows an exemplary computing environment.

In some implementations, the client 110 may include a desktop personal computer, workstation, laptop, PDA, cell phone, smart phone, or any WAP-enabled device or any other computing device capable of interfacing directly or indirectly with the network 120 such as a computing device 400 illustrated in FIG. 4. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access information available to it at the server 140 or to provide information to the server 140. Other applications may also be used by the client 110 to access or provide information to the server 140, for example. In some implementations, the server 140 may be implemented using one or more general purpose computing systems such as the computing device 400 illustrated in FIG. 4.

Figure 2:
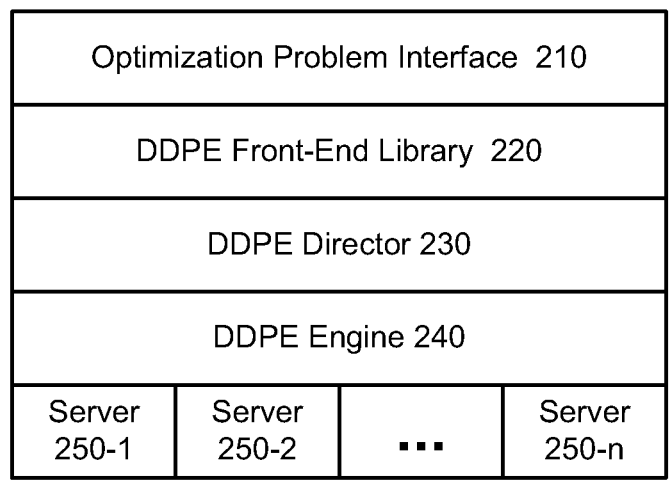
FIG. 2 is a block diagram representing the software stack for several implementations disclosed herein.

FIG. 2 is a block diagram representing the software stack for several implementations disclosed herein that, for example, may be built on top of a distributed computation framework for large clusters. The software stack 200 comprises an optimization problem interface 210, a DDPE front-end library 220, a DDPE director 230, a DDPE engine 240, and a plurality of computing machines or servers 250-1, 250-2, . . . , 250-n.

The DDPE engine 240 is a software layer that coordinates the execution of multiple dependent programs (processes) running on a computer cluster and communicating with each other through unidirectional channels. Each job on the DDPE engine 240 is a directed multigraph where nodes represent processes and edges represent communication channels. For certain implementations, such graphs may be acyclic in order to enable the DDPE engine 240 to provide automatic fault tolerance without any knowledge of the application semantics. Jobs on the DDPE engine 240 execute in a no-sharing environment, that is, (a) having no shared memory or disk state between the various processes in the job execution, (b) where vertices cannot open network connections to each other, and (c) where the only communication medium between processes are the channels (which, in some implementations, may be implemented as direct network connections). The DDPE engine 240 also handles the reliable execution of the graph on a cluster, that is, the DDPE engine 240 schedules computations to cluster computers, monitors their execution, collects and reports statistics, and handles transient failures in the cluster by re-executing failed or slow computations.

The DDPE director 230 is a director which translates director-specific computations into job graphs that can be executed on a cluster by the DDPE engine 240. The DDPE director 230 provides a set of operators that perform computations on collections of values where, for certain implementations, the director-specific language may be similar to the SQL database language and the collections are the equivalent of database tables. In addition, collections may be partitioned by the DDPE director 230, with different partitions residing on different machines in the cluster. During computation, the collection elements are moved between computers, so the in-memory data structures are serialized to a shared physical medium, either a disk or the network. To this end, the DDPE director 230 automatically generates serialization and de-serialization code, although for certain implementations the user may replace the default serialization routines with custom routines.

For some implementations—and unlike SQL—the DDPE director 230 may be "embedded" within the ".Net languages" such that there are operators for C#, VB, and F#, for example. For several implementations, the basic DDPE director 230 operations may comprise (1) applying a transformation (function) to all elements in a collection, (2) filtering elements according to a predicate, (3) grouping elements by a common key, (4) aggregating the elements according to some function (e.g., addition), and (5) joining the elements in two collections using a common key. Thus, for a user/programmer of the system, a benefit of the DDPE director 230 is the provision of a single high-level programming language (a ".Net language") to write the application and blending seamlessly the local and distributed parts of the computation in a single program due to tight embedding of the DDPE director 230 within these well-known languages.

In several implementations the DDPE director 230 not only generates job graphs but also generates parallel multi-threaded code for each of the processes in a job graph to utilize multiple processing cores. In certain such implementations, the parallelization across cores may use similar techniques to the parallelization across machines. The DDPE director 230 translates the operations on the large collections into operators on individual partitions which are then further partitioned across cores and processed in parallel. Moreover, for some implementations, the DDPE director 230 may provide a generalization of the map-reduce computation model—comprising a particular sequence of operators such as, for example, SelectMany, GroupBy, and Aggregate—that is elsewhere implemented in both proprietary and open-source computation stacks known to those of skill in the art.

Several implementations disclosed herein are directed to methods for parallelizing search tree exploration where execution is orchestrated by a communication server 140 which coordinates the execution of many rounds of computation on the cluster 150 by launching multiple DDPE director 230 computations. Moreover, for certain implementations some components, such as the DDPE director 230 and DDPE engine 240, may be combined into a single element without loss of generality.

Figure 3A:
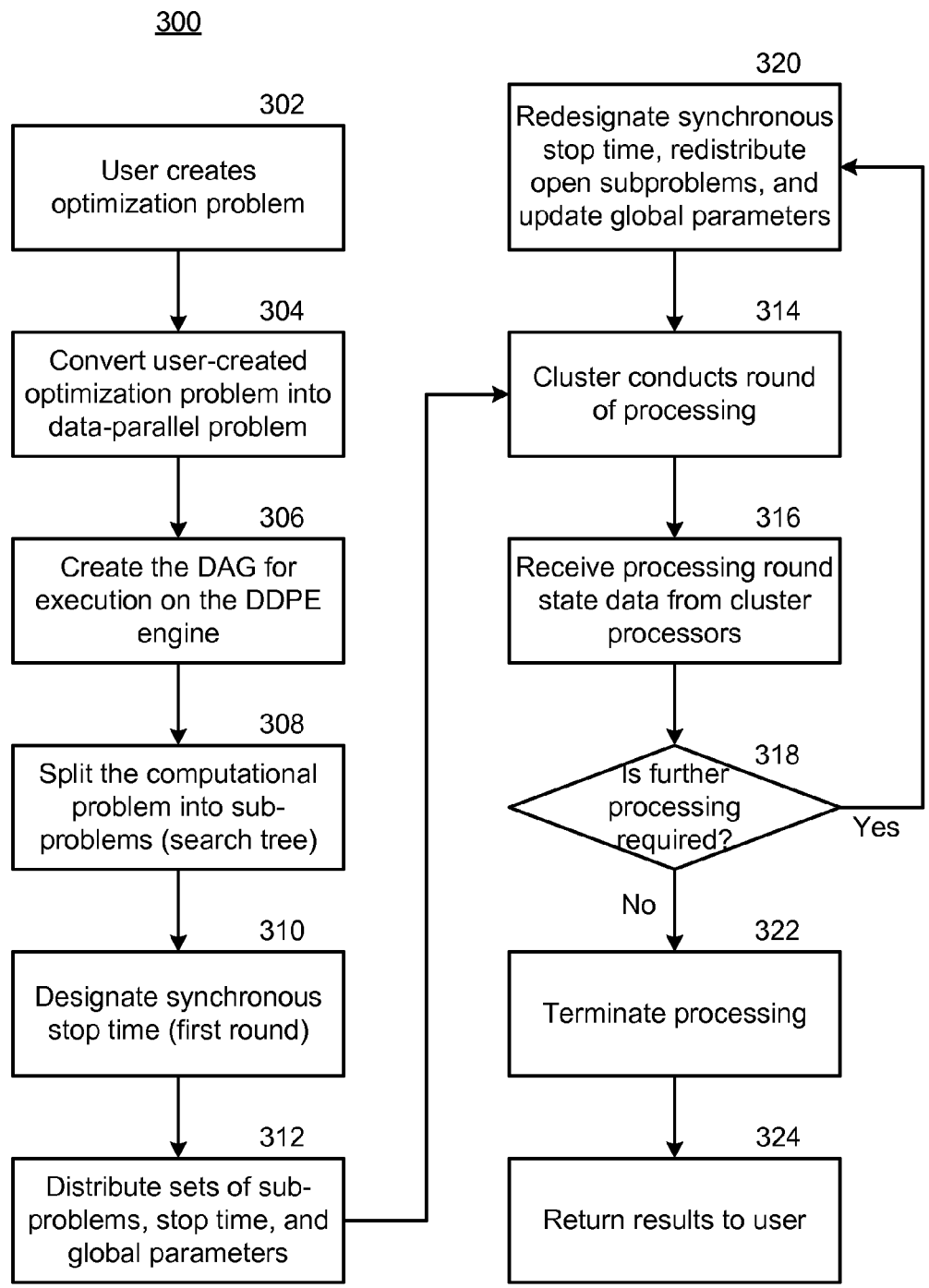
FIG. 3A is an operational flow diagram of an exemplary process 300 for using a B&B algorithm on a DDPE system.

FIG. 3A is an operational flow diagram of an exemplary process 300 for using a B&B algorithm on a DDPE system. At 302, a user creates an instance of an optimization problem that may be written using sequential constructs. At 304, the DDPE front-end library (or front-end) converts the user optimization problem into a data-parallel computational problem. At 306, the DDPE director creates a DAG for data-parallel execution on the DDPE engine. At 308, a DDPE engine computer (referred to as a first processor, control processor, or client processor) splits the computational problem into a plurality of sub-problems using a branch-and-bound algorithm.

At 310, the first processor designates a synchronous stop time for a plurality of processors (e.g., a cluster) to complete execution of their processing and report back with results, and at 312 the first processor randomly and evenly distributes a set of sub-problems to each processor in the cluster along with the synchronous stop time and other global parameters such as the current global upper bound and global lower bound, for example.

At 314, the cluster (or plurality of processors) conducts a round of processing for the plurality of sub-problems by recursively using a branch-and-bound algorithm (without inter-machine communications) until the synchronous stop time expires (as detailed more fully in the discussion of FIG. 3B below). At 316, the first processor receives from the cluster machines their processing round state data (such as the local upper and lower bounds for each processor in the cluster), and then at 318 the first processor determines whether to terminate or if further processing is required based on the processing round state data received from the cluster.

If further processing is required, then at 320 the system (first processor and the cluster) recursively continues processing by redesignating the synchronous stop time, redistributing the synchronous stop time and evenly and randomly redistributing the open sub-problems to the cluster, and providing updated global data until such time additional processing is not required. When processing is complete, and no more open sub-problems remain—at 322 cluster processing is terminated and at 324 the results are returned to the user.

Figure 3B:
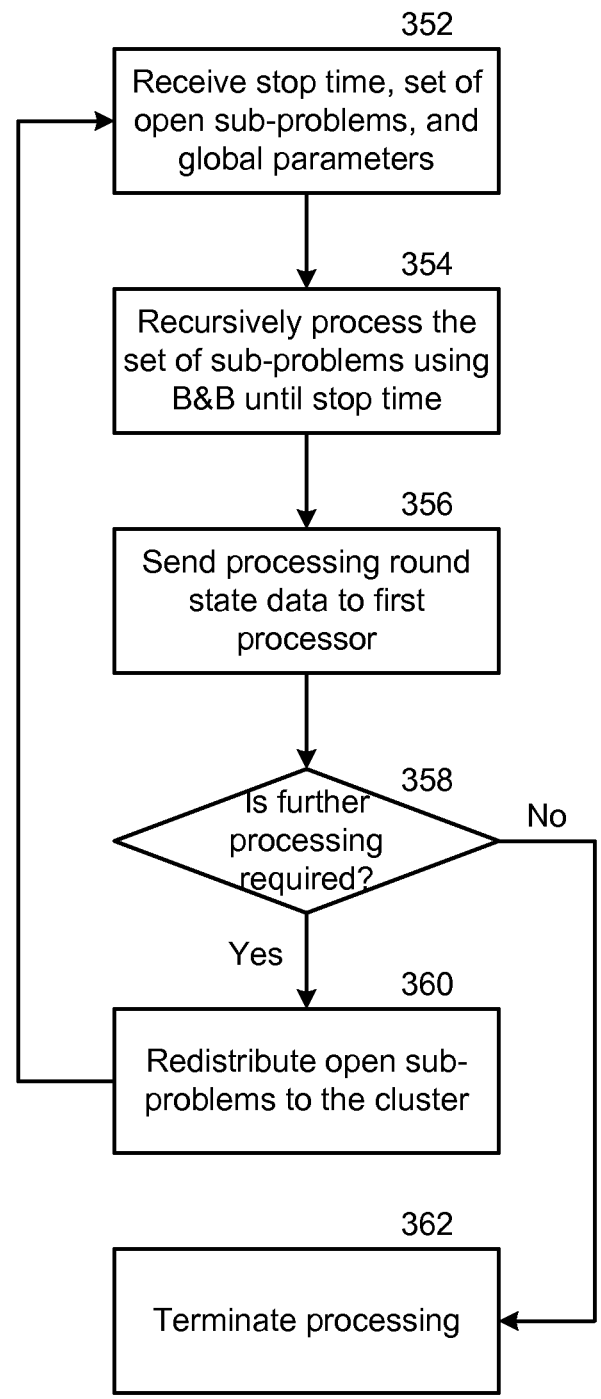
FIG. 3B is an operational flow diagram of an exemplary process 350 for a single cluster processor (or machine) conducting a round of processing using the B&B algorithm on the DDPE system of FIG. 3A.

With regard to element 314 of FIG. 3A, FIG. 3B is an operational flow diagram of an exemplary process 350 for a single cluster processor (or machine) conducting a round of processing using the B&B algorithm on the DDPE system of FIG. 3A. In the figure, at 352 the processor receives the synchronous stop time from the first processor along with a set of sub-problems comprising its share of the work and any associated data (such as the current global upper bound and lower bound). At 354, the processor recursively processes, using the B&B algorithm, the set of sub-problems it has received until the stop time, during which time it creates new sub-problems, prunes other sub-problems, and/or solves certain sub-problems all the while tracking the estimated local parameters—all of which is completed without any communications with other processors in the cluster.

When the round ends at the stop time, at 356 the processor sends the processing round state data to the first processor, including the relevant local parameters (local state). At 358, the processor then receives either a terminate command or data necessary to commence the next round of processing—namely an updated synchronous stop time, as well as new global upper and/or lower bounds (global state), etc. If the latter, then at 360 the processor redistributes any of its remaining open sub-problems to the cluster and the recursively repeats the process until terminated. Conversely, when a terminate command is received, then at 362 the process terminates.

Stated differently, and referring again to FIG. 1, in certain implementations the communication server 140 (and corresponding to the first processor of FIGS. 3A and 3B) receives the problem instance from the client 110 which represents the first root element of a new search tree. The communication server 140 then repeatedly runs the sequential solver locally to flesh out the tree and generate a large initial frontier of open sub-problems (leaf nodes in the tree) that will provide enough work for the cluster 150, and this initial frontier becomes the inductive basis for further processing in rounds on the cluster 150. The communication server 140 evenly distributes subsets of the open sub-problems to the servers 152-1, 152-2, . . . , 152-n comprising the cluster 150. The B&B algorithm then proceeds in rounds with each round executed on the cluster such that each round starts from the current frontier and explores a new set of nodes in the search tree resulting in a new frontier. After a round of computation on the cluster, control may be returned to the communication server which decides whether to start a new round or terminate. If not sooner, the communication server 140 (or, in certain alternative implementations, the client 110) declares the algorithm over when the frontier is empty.

For certain implementations, the number of sub-problems split from the computational problem will be substantially larger than the number of processors in the plurality of processors in order to ensure enough work for each processor and to better allocate (and later balance) the work. Similarly, in several implementations the synchronous stop time is designated and recursively redesignated to provide a substantially long duration for each round of processing, which in some cases may be on the order of minutes, in other cases on the order of seconds, and for several implementations it may be calculated to achieve an optimal number of rounds to balance the benefits of load balancing against the cost of inter-round communications. Moreover, for certain implementations the determination that further processing is required may be found when the global lower bound is not equal to the global upper bound, and further processing is not required may be found when the global lower bound is equal to the global upper bound. In other implementations, a global stop condition might occur where further processing is not required even if the global lower bound is not equal to the global upper bound, such as when there is a system time limit or when a range (i.e., the global upper and lower bounds) provides a sufficient answer to the user query as determined by the user. For various implementations, each sub-problem's position in the tree, including its ancestors from itself to the root (the "root-to-leaf information"), may be maintained and be communicated with each sub-problem, such as when sub-problems are distributed and redistributed from a source processor to a destination processor, and such data may be created at the time the sub-problem (that is, its node in the search tree) is created.

For certain implementations, the nodes in the frontier of the search tree that are inputted to and outputted from each round may be partitioned into disjoint sets where each set is manipulated by an independent machine in the cluster. In certain embodiments, these partitions may be kept relatively large (comprising many tree nodes) in order to allow each cluster machine to compute independently for an extended period of time. Then, after the end of each round, the nodes in the output frontier may be randomly redistributed among cluster machines to provide load-balancing of the work in preparation for commencing the next round.

For several embodiments, the cluster execution may be handled by the DDPE engine runtime insofar as handling the job initiation, scheduling the data movement, re-executing computations if they fail or are too slow, and allocating cluster machines as they become available.

In order to exploit the multiple cores that may be available on each cluster machine, certain implementations may further utilize a separate multi-threaded solver engine to partition the work of each machine onto the multiple cores. For certain implementations the structure of the multi-threaded engine may be identical to implementations of the DDPE systems disclosed herein, while other implementations might employ something similar to the DDPE systems disclosed herein but might also use a form of work-stealing since the communications between cores on a single machine can be relatively efficient and since work stealing may be implemented between threads which share a single address space (i.e., executed on the same machine).

Several implementations disclosed herein are also directed to an API offered by the DDPE front-end library, that is, the interface between the sequential solvers (utilized by the user) and the DDPE engine. For some implementations, to utilize the DDPE engine via the API a user may define classes representing an instance (sub-problem), the state of the computation, and the actual function that processes the sub-problems. For certain implementations, the API may be represented as a set of three C# interfaces, similar to the Java interfaces and C++ abstract base classes, to which users must adhere.

For these implementations, the user creates a class to represent each sub-problem to be processed, implementing the following interface:

```
[Serializable]
public interface IBBInstance { }
```

Although IBBInstance has no required methods, it is serializable since objects of this type will be transmitted between machines by the DDPE director. Besides representing the sub-problem itself, an object of this class may also contain various pieces of sub-problem-specific information, such as a lower bound. Moreover, an instance does not need to be self-contained but, instead, instances can contain incremental representations which explain how an instance can be obtained from a parent instance in the branch and bound tree by applying a set of changes, and this incremental representation may help minimize communication.

For example, with regard to a Steiner tree problem, a classic graph optimization problem known and appreciated by those of skill in the art, the class that implements this interface might be called SteinerInstance, and it represents a graph in incremental form. The instance at the root of the tree (the original problem input) describes the whole graph, with its list of nodes and weighted edges, together with the original set of terminals. An instance elsewhere in the tree contains a list of terminal insertions and vertex or edge deletions to be applied to the parent. For certain implementations, however, the user is not required to use incremental representations but, instead, the sub-problems may be represented in full.

The global state class is a container for the global problem-specific information about the computation, and for certain implementations the interface might be as follows:

```
[Serializable]
public interface IBBGlobalState {
  void Merge (IBBGlobalState s);
  void Copy (IBBGlobalState s);
}
```

In some implementations, a global state field might contain the value of the best upper bound found so far, among other information. For example, in the Steiner tree application, the class implementing this interface (e.g., SteinerBBLocalState) may maintain the upper bound and the corresponding best solution. During the distributed computation, each machine will receive a private copy of the global state, and each machine will update its private copy of the global state based only on its local information. Thus the individual private states will diverge between machines during each round. Then, between rounds, the DDPE engine front-end might collect the various versions of the global state (the private copies maintained by each cluster machine) and merge them into a single, updated global state which is then redistributed to the cluster machines for the next round. The two methods of IBBGlobalState (merge and copy) enable these operations to be performed.

In addition, the user might implement a sequential solver class via the following interface:

```
public interface IBBSolver {
  List<IBBInstance> Solve (
    List<IBBInstance> incrementalSteps,
    IBBGlobalState state,
    BBConfig config
  )
}
```

For certain embodiments, this solve method can be arbitrarily complicated, and is entirely up to the user. In some embodiments, this may be a sophisticated and carefully engineered piece of code which is efficient when executed sequentially. Regardless, most of the code written by the user is expected to reside in this function, which is then invoked by the framework as an upcall. More specifically, this solve function receives as input a single problem (expressed as a chain of incremental steps) and outputs a list of child sub-problems. An empty output list would indicate that the user does not wish to explore further the specific branch of the computation corresponding to that output list, either because the sub-problem has already been solved to completion or because of a heuristic determination.

The first input (incrementalSteps) to this solve function Solve may be represented as an ordered list of objects of type IBBInstance and contain all instances on the path from the root of the search tree to the open sub-problems that still need to be solved—that is, a list of increments. If needed, Solve might use the increments to compute a complete (i.e., nonincremental) description of the sub-problem internally. The second input parameter of Solve (i.e., state) is an object representing the local copy of the global state of the computation, and the Solve function may update its contents as necessary. The third parameter (config) may be a read-only object containing various hints that may be useful for Solve but that Solve may completely ignore without compromising the correctness of the application. For certain implementations, the configuration may contain a seed (used to coordinate random number generators across machines), the current error verbosity level, and/or the desired branching factor, all of which are useful but not necessary to proper operation. For example, in the Steiner application the solver class (called SteinerBBSolver) uses the branching factor to decide whether to generate a large or a small number of child instances as a trade-off between parallelism and memory utilization.

In several implementations, the actual optimization engine may be a generic parameterized class that implements the following interface:

```
public interface BranchBoundEngine
  <TInstance, TSolver, TGlobalState>
  where TInstance : IBBInstance
  where TSolver : IBBSolver
  where TGlobalState : IBBGlobalState
{
  TGlobalState
  Run(TInstance i, TGlobalState g);
}
```

To maximize flexibility, certain implementations of the engine may comprise three versions of the branch-and-bound front-end: a sequential version, a multi-threaded version, and a DDPE optimization version as a distributed version that runs, through a DDPE director, on top of a DDPE engine that also invokes the multi-threaded engine on each machine in the cluster.

To solve an instance of a hypothetical Steiner tree problem using this approach, two objects are initialized representing a problem to solve and the initial state, respectively:

```
SteinerInstance problem;
SteinerBBGlobalState upperBound;
```

Then the DDPE front-end's solver may be invoked:

```
SteinerBBSolver sequentialSolver = new SteinerBBSolver( );
FrontEndLibrary<SteinerInstance,
SteinerBBSolver,
SteinerBBGlobalState>
frontEndLibrary = new FrontEndLibrary (sequentialSolver);
TGlobalState
result = frontEndLibrary.Run(problem, upperBound);
```

The global state resulting from this computation contains the solution instance (result).

For certain implementations, in order to be compatible with the DDPE director, the DDPE front-end may be expressed as a chain of computations on collections. For such implementations, the DDPE front-end manipulates collections of work units where each work unit is a container packaging (1) a collection of open sub-problems to be solved, including their position in the search tree, (2) a local version of the global state, and (3) computation statistics. When sub-problems are represented incrementally, a work unit may also maintain the ancestors of these sub-problems in the B&B tree such that each work unit represents an entire subtree whose leaves are open sub-problems. Each search node of a work unit subtree is represented only once to prevent an exponential space blow-up. At the end of each computation round, each work unit represents a unique subset of open sub-problems, and the union of all work units is the current frontier of the computation that contains all open sub-problems.

From the point of a view of a single cluster machine, one round of the DDPE front-end comprises readily-identifiable elements. The machine first receives a collection of work units (one from each machine in the previous round) and merges them into a single work unit. The machine transforms the single work unit into a new work unit for the next round by processing some (or all) of the open sub-problems in the corresponding subtree and possibly generating new sub-problems if needed. The work unit thus created is then split (partitioned) into work units for each computer in the cluster for the next round.

During the merge operation, cluster computer combines the work units it receives with the work units it has retained for itself. While the leaf nodes (each an open sub-problem) for the individual work units being merged are disjoint (i.e., no duplication and no redundancy), some ancestor nodes may appear more than once across the plurality of individual work units received and those retained. However, since these ancestor nodes have already been previously processed, only one of each ancestor node needs to be retained while the duplicate ancestor nodes can be discarded. The merge operation also combines local statistics and local global states information from the individual work units it receives to update its own local statistics and local global state information.

During the transform operations, the DDPE front-end traverses the resulting merged tree (now that processor's current tree) and repeatedly processes leaf nodes (each an open sub-problem) using the user-defined Solve function which will generate new children leaf nodes (dividing the sub-problem into smaller sub-problems) and/or solve to conclusion the sub-problem presented by the leaf (if it is simple enough to solve). This process is repeated—with the tree being traversed and leaves being processed based on the user-defined Solve function—until the period of time allocated for the round expires, or until there are no more leaf nodes (sub-problems) to solve. The resulting subtree (even if empty) is then represented as a new work unit. Finally, DDPE front-end splits a work unit into k work units by evenly but randomly partitioning its open problems (leaf nodes) into k groups (partitions).

While maintaining k trees in memory could be expensive, in certain implementations the DDPE director may perform streaming computation on the collections and thus only load that data necessary for immediate processing from the channel storage into memory. For such implementations, the split operation may generate work units one at a time, committing them immediately to the output channel when formed, and garbage-collecting them from memory once outputted.

Similarly, the merge operation does not need to keep all the k input trees in memory at once but, instead, certain implementations may read the k inputs in streaming fashion and incrementally construct a global tree by merging the inputs serially (one at a time). These operations (including the work unit abstraction) may be completely hidden from the user.

As for traversing a search tree, two well-known approaches are the breadth-first search (BFS) and the depth-first search (DFS). BFS processes sub-problems that are relatively closer to the root before processing sub-problems that are relatively further (i.e., deeper) from the root. This approach allows broad exploration of the search space but may lead to a very large number of open sub-problems. In contrast, DFS explores deeper nodes first, effectively minimizing the number of open sub-problems at any given time and thus is more memory-efficient. To ensure that computational resources are fully utilized, the DDPE front-end may generate enough sub-problems to keep all machines occupied and thus seemingly favors a BFS approach that would generate more sub-problems. However, since BFS can be very memory-intensive, the DDPE front-end switches from BFS to DFS when system memory nears maximum capacity. A third approach for traversing a B&B tree is the best-first search (BeFS) which, in effect, first processes the open sub-problems that are more likely to lead to good solutions or efficient processing according to some problem-specific metric such as, for example, computational cost.

Several implementations disclosed herein are directed to synchronizing cluster processing operations and complete work in time-predetermined rounds, where communications are permitted between rounds to enable work to be efficiently redistributed for processing in a subsequent round. Of course, if a machine runs out of work in the middle of a round, it still needs to wait for the round to end, but it will be a relatively small delay (and inefficiency stemming from resource underutilization). Nevertheless, by working in rounds and performing periodic redistributions, it may be ensured that the machines start each round with roughly the same number of open sub-problems. Second, by making sure these redistributions are random, the correlations between nearby sub-problems in the search tree may be attenuated. It is often the case that some subtrees are "easier" than others; in other words, the heights of the subtrees rooted at two siblings are often similar. In general, it is not known whether a node is relatively easy or hard until its entire subtree is processed, but randomization ensures that most machines have access to nodes of both kinds. Third, the DDPE front-end tries to boost the effectiveness of the first two techniques by maximizing the number of sub-problems available. One way in which it does so is by preferring BFS over DFS whenever possible, as described above. It also uses hints to encourage the user-defined Solve function to immediately generate more child nodes when beneficial to do so.

As previously disclosed herein, a DDPE front-end works in rounds, with a plurality of machines in a cluster operating in parallel. Ideally all machines should be busy at all times so that they all finish at approximately the same time. However, the DDPEE framework does not provide any communication channel among cluster machines to synchronize termination or call a stop during the round. Consequently, the DDPE front-end sets a deadline for how much time each machine has to perform its work, and each machine stops work at the deadline even if it still has open problems that need to be solved. (Of course, the machine also stops if it runs out of sub-problems.) One way to specify the stop time (or "budget") would be in terms of invocations of the sequential solver (or some other deterministic operation count). Unfortunately, the time to process a sub-problem can vary wildly within the same branch-and-bound tree, making this approach unsuitable for load-balancing. Alternatively, the budget may be defined in terms of real elapsed time; each node is given a certain number of seconds b to run, and stops when this limit is reached. The limit should be high enough to amortize the communication and setup costs between rounds, but low enough to ensure reasonably frequent redistributions for load-balancing purposes. This approach works well as long as all cluster processors start at the same time and run to completion. However, on a shared cluster infrastructure, where multiple jobs compete for resources (or in the presence of failures), the number of machines available for a job can fluctuate randomly. Therefore, to maximize utilization, the budget may include, for several implementations, not only a computation time but also a deadline. Thus when starting a new round, the client machine may use the current time $t_0$ and gives to each machine a deadline of $t_0+b$. Moreover, to avoid the situation resulting from mis-synchronized clocks, certain implementations may use the lesser of the deadline and the local machine time, that is, $\min(t_0+b, tl_0+b)$ where $tl_0$ is the local machine time.

FIG. 4 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by device 400 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while certain examples disclosed herein may be directed to a particular type of problem (such as a minimization problem), other types of problems (such as a maximization) are also contemplated for alternative implementation disclosed herein, and thus no limitations are intended with regard to the specific examples disclosed herein.

What is claimed:

1. A method for a distributed data-parallel execution (DDPE) system, the method comprising:
    deriving a computational problem from a user-defined serial problem;
    splitting the computational problem into a plurality of sub-problems using a branch-and-bound algorithm, wherein each sub-problem of the plurality of sub-problems maintains root-to-leaf information;
    designating a synchronous stop time for a plurality of processors;
    distributing the synchronous stop time and the plurality of sub-problems to the plurality of processors;
    conducting a round of processing on the plurality of processors for the plurality of sub-problems by recursively using the branch-and-bound algorithm until the stop time and without inter-processor communications during the round;
    receiving processing round state data from the plurality of processors indicating whether there are any open sub-problems remaining that require further processing, wherein the processing round state data comprises root-to-leaf information for each open sub-problem;
    determining if further processing is required based on the processing round state data and:
        if further processing is required, then until further processing is not required:
            redesignating the synchronous stop time;
            redistributing the synchronous stop time and any open sub-problems to at least one processor from among the plurality of processors; and
            repeating the conducting, receiving, and determining; and
        if further processing is not required, then terminating processing on the plurality of processors.

2. The method of claim 1, wherein a number of sub-problems split from the computational problem is substantially larger than a number of processors in the plurality of processors.

3. The method of claim 1:
    wherein distributing further comprises evenly and randomly distributing the plurality of sub-problems to the plurality of processors; and
    wherein redistributing further comprises evenly and randomly distributing the plurality of sub-problems to the plurality of processors.

4. The method of claim 3, wherein for the redistributing, each processor from among the plurality of processors independently redistributes its open sub-problems evenly and randomly to the plurality of sub-processors.

5. The method of claim 1:
    wherein splitting further comprises calculating of a global state of processing the computational problem;
    wherein distributing further comprises distributing the global state to the plurality of processors;
    wherein the processing round state data further comprises, for each processor from among the plurality of processors, a local state;
    wherein determining further comprises updating the global state based on the processing round state data; and
    wherein redistributing further comprises redistributing the global state to the plurality of processors.

6. The method of claim 5, wherein the plurality of processors utilize the global state to prune a subset of sub-problems from among the plurality of sub-problems during the round of processing while utilizing the branch-and-bound algorithm.

7. The method of claim 6:
    wherein each processor from among the plurality of processors calculates its local state;
    wherein each processor from among the plurality of processors updates its local state upon receipt of the global state;
    wherein each processor from among the plurality of processors updates its local state during utilization of the branch-and-bound algorithm; and
    wherein the processing round state data comprises the local state received from each processor from among the plurality of processors.

8. The method of claim 5, wherein for the determining and based on the branch-and-bound algorithm, further processing is required when the number of open sub-problems is greater than zero, and further processing is not required when the number of open sub-problems is equal to zero.

9. The method of claim 8, further comprising determining a global stop condition where further processing is not required even if the number of open sub-problems is greater than zero.

10. The method of claim 1, wherein the user-defined serial problem is expressed in SQL.

11. The method of claim 1, wherein for the designating and recursively redesignating the synchronous stop time, providing a duration for each round of processing.

12. The method of claim 1:
    wherein distributing further comprises distributing root-to-leaf information for each sub-problem along with that particular sub-problem to a destination processor from among the plurality of processors.

13. The method of claim 12, wherein redistributing further comprises redistributing root-to-leaf information for each open sub-problem along with that sub-problem to a destination processor from among the plurality of processors.

14. A system for distributed computation comprising:
    a plurality of processors constituting a distributed data-parallel execution (DDPE) system; and
    a first processor that:
        derives a computational problem from a serial-processing problem;
        splits the computational problem into a plurality of sub-problems using a branch-and-bound algorithm, wherein each sub-problem of the plurality of sub-problems maintains root-to-leaf information;
        designates a synchronous stop time for the plurality of processors;
        distributes the synchronous stop time and the plurality of sub-problems to the plurality of processors;
        receives processing round state data from the plurality of processors indicating whether there are any open sub-problems remaining that require further processing, wherein the processing round state data comprises root-to-leaf information for each open sub-problem; and
        determines if further processing is required based on the processing round state data and:
            if further processing is required, then until further processing is not required:
                redesignates the synchronous stop time;
                distributes the synchronous stop time to the plurality of processors; and
                repeats the receiving and determining elements herein; and
            if further processing is not required, then distributes to the plurality of processors a terminate command and returns a result to the computational problem.

15. The system of claim 14, wherein each processor from among the plurality of processors:
- receives the synchronous stop time and at least one sub-problem from among the plurality of sub-problems;
- processes recursively the at least one sub-problem using the branch-and-bound algorithm until the stop time without inter-processor communications;
- sends processing round state data to the first processor; and
- receives from the first processor either a terminate command or an update to the synchronous stop time, and:
  - if a terminate command is received, then terminates processing; and
  - if a synchronous stop time is received, then redistributes any open sub-problems to at least one other processor from among the plurality of processors.

16. The system of claim 15, wherein the plurality of processors comprise at least two core processors constituting a single multicore processing unit, and wherein the plurality of processors comprise processors for at least two stand-alone computers.

17. The system of claim 14, wherein the serial-processing problem is expressed in SQL.

18. A storage memory comprising computer readable instructions for a distributed data-parallel execution (DDPE) system, the computer readable instructions comprising instructions for:
- distributing a synchronous stop time for a plurality of processors and a plurality of sub-problems of a computational problem to the plurality of processors, the computational problem having been automatically derived from a user-defined serial problem, wherein each sub-problem of the plurality of sub-problems maintains root-to-leaf information;
- conducting a round of processing on the plurality of processors for the plurality of sub-problems by recursively using a branch-and-bound algorithm until the stop time;
- receiving processing round state data from the plurality of processors indicating whether there are any open sub-problems remaining that require further processing, wherein the processing round state data comprises root-to-leaf information for each open sub-problem;
- determining if further processing is required based on the processing round state data and:
  - if further processing is required, then until further processing is not required: redesignating the synchronous stop time;
- redistributing the synchronous stop time and any open sub-problems to at least one processor from among the plurality of processors; and
- repeating the conducting, receiving, and determining elements.

19. The storage memory of claim 18, further comprising instructions for serializing data pertaining to the plurality of sub-problems.

20. The storage memory of claim 18, further comprising instructions for synchronizing the synchronous stop time to each processor comprising the plurality of processors.

* * * * *